(12) United States Patent
Mac Innis

(10) Patent No.: US 8,392,294 B2
(45) Date of Patent: Mar. 5, 2013

(54) COMPUTER IMPLEMENTED FINANCE MANAGEMENT ROUTING SYSTEM

(76) Inventor: Joseph Peter Mac Innis, Trabuco Canyon, CA (US)

(*) Notice: Subject to any disclaimer, the term of this patent is extended or adjusted under 35 U.S.C. 154(b) by 110 days.

(21) Appl. No.: 12/518,879

(22) PCT Filed: Dec. 11, 2006

(86) PCT No.: PCT/US2006/046963
§ 371 (c)(1),
(2), (4) Date: Jun. 11, 2009

(87) PCT Pub. No.: WO2008/073078
PCT Pub. Date: Jun. 19, 2008

(65) Prior Publication Data
US 2010/0023447 A1    Jan. 28, 2010

(51) Int. Cl.
*G06Q 40/00* (2006.01)
(52) U.S. Cl. .......................... 705/28; 705/30
(58) Field of Classification Search .............. 705/10–44
See application file for complete search history.

(56) References Cited

U.S. PATENT DOCUMENTS

| | | | | |
|---|---|---|---|---|
| 4,736,294 A * | 4/1988 | Gill et al. | | 705/38 |
| 4,953,085 A * | 8/1990 | Atkins | | 705/36 R |
| 5,576,951 A * | 11/1996 | Lockwood | | 705/26.62 |
| 7,366,694 B2 * | 4/2008 | Lazerson | | 705/38 |
| 7,392,221 B2 * | 6/2008 | Nabe et al. | | 705/38 |
| 7,596,509 B1 * | 9/2009 | Bryson | | 705/27.2 |
| 7,774,268 B2 * | 8/2010 | Bradley | | 705/38 |
| 7,908,210 B2 * | 3/2011 | Huber et al. | | 705/38 |
| 8,069,112 B2 * | 11/2011 | Hankey et al. | | 705/38 |
| 8,086,523 B1 * | 12/2011 | Palmer | | 705/38 |
| 8,160,956 B2 * | 4/2012 | Comstock | | 705/38 |
| 8,219,464 B2 * | 7/2012 | Inghelbrecht et al. | | 705/27.1 |
| 2002/0107765 A1 | 8/2002 | Walker | | |
| 2004/0015430 A1 | 1/2004 | May | | |

OTHER PUBLICATIONS

International Preliminary Report on Patentability for parent case, PCT/US06/46963.

* cited by examiner

Primary Examiner — Frantzy Poinvil

(57) ABSTRACT

Broadly, the present invention relates to data processing in general and more particularly to a finance management system or "system" (5) relating to the auto industry (25) that provides a gateway for vehicle purchase lead management tools to seamlessly integrate the auto sales process with the auto finance process, and enables sellers (25) to initiate, process, and decision loan transactions with financial institutions (100). The financial management system (5) described herein preferably includes, among other things, credit filters, (20), auto population of documents, and a decision engine (105) that retrieves or collects and combines or merges the borrower's credit file(s) (110) with an applicant's information (115), processes the information or data to a specific vehicle (145) and finance structure (160), matches the data against a lender's proprietary mix of loan programs, pricing, credit policies and/or custom scoring models (120) to determine if a borrower (30) has qualified for a loan, and makes a result presentation (155) of a finance level of acceptability available to the auto dealer (25).

16 Claims, 27 Drawing Sheets

"Get Pre-approved in Seconds Program"

The web-based "Get Pre-Approved in Seconds" Quick App is an interactive tool that pre-approves customers on-line within seconds.

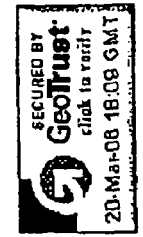

Quick Application

Any Sales Agent

Title:
First Name:
Last Name:
SurName:
M.I.

Residence
Street Number:
Direction: [North, West, etc.]
Street Name:
Unit Type: -- None -- Unit #: [Apt., Suite, etc.]
City:
State:
Zip Code: [Postal Code]

Drivers Lic. #:
Social Sec. #:
Birth Date:
Home Phone #:
Email Address:

Get pre-approved in seconds! It's quick, easy, and hassle free!

When you have completed this quick application and pressed the submit button, you will receive a decision response online within a few seconds!

SECURED BY GeoTrust
click to verify
20-Mar-08 18:09 GMT en español

If you have already started this Application, click here to access it.

Accept / Submit >>

By clicking "Accept / Submit", you submit and certify that all of the statements in this application are true and made for the purpose of obtaining credit. You authorize us to begin a credit investigation.

Privacy Statement   Electronic Disclosure   Federal Notices

Powered by DealerCentric

Fig. 3

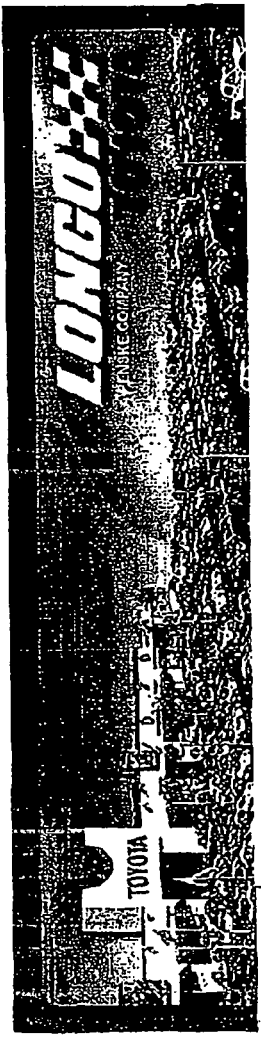
Fig. 5

Pre-approval Criteria

> Dealers set up their pre-approval credit criteria for the Get Pre-approved in Seconds Program.

| Main Menu | WorkFlow | Admin | Integration | Emails | Users | Inventory | Reports | Alert |

Partner Profile | Quick App Filters | Finance Filters

DCSDealer. Logout >> Send us Feedback >> Terms Of Use

☐ My Logon Start Page

Filter Configuration

Quick App Credit Filters:

| Choose Filter | ▼ | - Choose Condition - | ▼ | | Add Filter |

| | | Filter Rule | | Date Added |
|---|---|---|---|---|
| Modify | Delete | • Fair Issac Credit Score >= 550 | | 2/7/2006 9:40 AM |
| Modify | Delete | • Trade History in Months >= 8 | | 3/2/2006 5:13 PM |
| Modify | Delete | • Installment Acct. High in $ >= $1,000 | | 3/2/2006 5:15 PM |

Fig. 7

"Get Pre-approved in Seconds Program"

Consumer data is stored at each page submit, capturing lead information for dealer that is traditionally lost when consumers do not complete full traditional application.

Miscellaneous Information

Is there a Co-Applicant? No ▼ (Co-Applicant must be over 18 Years old)

Years/Month at current Address: 2 Years ▼ 2 Months ▼

Do you own or rent? Rent ▼

Rent Amount/Mortgage Payment: $1,200

Best Contact Place and Time: ○ Home ● Work 2:00 PM ▼

View Privacy Policy  View Electronic Disclosure  View Federal Notices

Submit

Car Buying Power!
You are now at the final step of having car-buying power with pre-arranged financing before you purchase your next vehicle. Lenders need your rent or house payment information etc. in order to provide the final terms of your approval.

Fig. 9

"Get Pre-approved in Seconds Program"

Upon completing the quick app, a credit report is pulled and pre-approves consumer based on dealer defined credit criteria such as minimum credit score, time on credit report, high credit etc.

Loan & Vehicle Information

Loan Request

Term: 60 Months
Requested Monthly Payment: $ 300
Requested Down Payment: $ 2,000
Amount to Finance: $ 30,000

⦿ Purchase ○ Lease  Type: New  Make: Toyota  Model: Corolla  Do you have a Trade-in? Yes

Trade-in

1998  Make: Toyota  Model: Camry

Submit

View Privacy Policy  View Electronic Disclosure  View Federal Notices

Congratulations!

Based on your Credit Report, you have been Pre-Approved for an Auto Loan!

To determine your interest rate and monthly payments etc., we need more information about the type of vehicle you want and how much you want to borrow. You acknowledge the terms of the Pre-Approval [Disclaimer] by providing the additional information for final approval.

Fig. 10

"Get Pre-approved in Seconds Program"

If a consumer does not pass the minimum pre-approval criteria, Carmen encourages the consumer to complete the application for special finance.

Loan & Vehicle Information

Loan Request

Term: [60 Months ▼]

Requested Monthly Payment: $ [300]

Requested Down Payment: $ [2,000]

Amount to Finance: $ [30,000]

⦿ Purchase ○ Lease    Type: [New ▼]    Do you have a Trade-in? [Yes ▼]

[2004 ▼]    Make: [Toyota ▼]    Model: [Corolla ▼]

Trade-in

[1998 ▼]    Make: [Toyota ▼]    Model: [Camry ▼]

[Submit]

Thank you for submitting your quick application. We do not currently have a program available to provide you with a pre-approved offer. However, if you provide more information about yourself, the type of vehicle you want and how much you want to borrow, we may still be able to obtain financing for you. Continue the Application so we may be of further assistance.

View Privacy Policy  View Electronic Disclosure  View Federal Notices

Fig. 11

Credit Reports

Dealers can view credit report and comparison to their pre-approval credit criteria.

| Main Menu | WorkFlow | Admin | Integration | Emails | Users | Inventory | Reports | Logout |
|---|---|---|---|---|---|---|---|---|
| Search | New Lead | New Quick App | New Application | | | | | |
| Summary | Email | Application | Credit | Inventory | F&I | Lenders | | |

Demo Dealer  Logout >> Send us Feedback >> Terms Of Use

☐ My Logon Start Page

Credit Reports                                                                           Prospect: Jon Q Consumer 🔄 Run Credit Filters

| Applicant | Criteria | Report | Result | Info | Date |
|---|---|---|---|---|---|
| Jon Q Consumer | Fair Issac Credit Score >= 550 | 700 | Pass | None | 11/8/2005 |
| Jon Q Consumer | Trade History in Months >= 12 | 455 | Pass | None | 11/8/2005 |
| Jon Q Consumer | Installment Acct. High in $ >= $1,000 | $400,000 | Pass | None | 11/8/2005 |

Main-Applicant

Pull Credit

🖨 Print Report

```
-TSP1 DPX 1544640XXXXXXX
Consumer,Jon Q 999999990;
CA-123 Main /Sunland CA 99939;
VERIFY-HS/Y2; V-07/091/MCBZ.5; PARSED;
/////////////////////// DC Solutions Report  ////////////////////////
//         Experian-Style Report Generated from Experian Data      //
// Operator: DF    InqIdx: 8971       Data Timestamp: 03/30/02 10:37 //
//                                     Printed: 05/27/05 18:15      //
////////////////////////////////////////////////////////////////////

JONATHAN QUINCY CONSUMER      SS: 999-99-9990     E: Ajax Hardware
123 Unparseddca ST Apt 0          234-56-7891*      2035 Broadway Suite 300
Testville IL 12345                123-45-6789*      LOS ANGELES CA 90019
RPTD: 6-95 TO 1-98 U 0 3X     YOB: 1951            RPTD: TO 12/98 U
LAST SUB: 1220855
```

Fig. 12

Internet Lead Management

Upon login, Dealers can filter leads and apps by multiple criteria and then sort by multiple criteria for customer selection.

| Main Menu | WorkFlow | Admin | Integration | Emails | Users | Inventory | Reports | Logout |
|---|---|---|---|---|---|---|---|---|
| Search | New Lead | New Quick App | New Application | | | | | |

DCSDealer Logout >> Send us Feedback >> Terms Of Use  ☐ My Logon Start Page

Prospect Search

Life to Date Applications: 5   Leads: 0                    Search by Last Name: [     ] Go

Search Results

Searched Applications that are currently active and were received in Feb 2006           Found 4 Prospects

| Applications ▼ | Filter Results by: | - All Active - ▼ | Go | | When: Feb 2006 ▼ |
|---|---|---|---|---|---|

| Applicant Name | Score | Received ▲ | Assigned To | Follow-Up | Follow-Up Status | |
|---|---|---|---|---|---|---|
| Harvey Homeloan | 729 | 02/07 10:57 | | | | Mark Sold |
| Terry Tradeline ■ | 659 | 02/07 09:56 | Internet Manager | 03/28 09:13 | Appointment Scheduled | Mark Sold |
| Sylvia Testco ■ | 741 | 02/07 09:19 | Internet Manager | 02/08 09:08 | Waiting for Manager Approval | Mark Sold |
| Alan Applicant ♦ | 702 | 02/07 09:12 | Sales Agent | 02/11 06:27 | Call-back Scheduled | Mark Sold |

Page 1 - No other pages

Legends:   ■ Hot Priority          Warm Priority       ● Cold Priority        ◊ New Prospect
           [30] 30 minutes +     [60] 60 minutes +   [90] 90 minutes +

Fig. 13

Lead Summary

Use the lead summary page to contact customer, check follow-up status, schedule appointments and send emails etc.

Prospect

Contact Info:　　　　　　　Modify Information

Customer Name: Terry Tradeline
Home Phone: (999) 999-9999　PREFERRED
Work Phone: (999) 999-9999
Contact Time: 9:00 AM
Email Address: cindy.cook@dealercentric.com Current Status:
Lead Source: (...)
Assigned To: Internet Manager
Follow Up Status: Appointment Scheduled
Follow Up Date: 3/28/2006 9:13 AM
Priority: Hot
Last Comment: fdfdsfgdsf Requested Vehicle Information:　　Modify Information
Purchase or Lease: Purchase
New/Used: New
Trade In: Yes Year: 2005
Make: Toyota
Model: Tacoma Loan Request:
Term: 60 Months
Requested Monthly Payment: $465.00
Requested Down Payment: $3,500.00
Amount to Finance: $21,995.00

Trade-In:
Year: 2001
Make: Honda
Model: Accord

Modify Application Status

Archive as 'Sold'　　Send To Archive
Status: Appointment Scheduled
Priority: Hot
Assigned To: [Administrator] Internet Manager
Follow up Date: (Click Calendar to set Date & Time)
Comments:

Application History

Application Status: Completed
Quick-App Filter Results: Nein Applicant: Passed
Send To Finance
Finance Status: (...)
Comments: (...)

Go to: Send Email to Prospect

Fig. 14

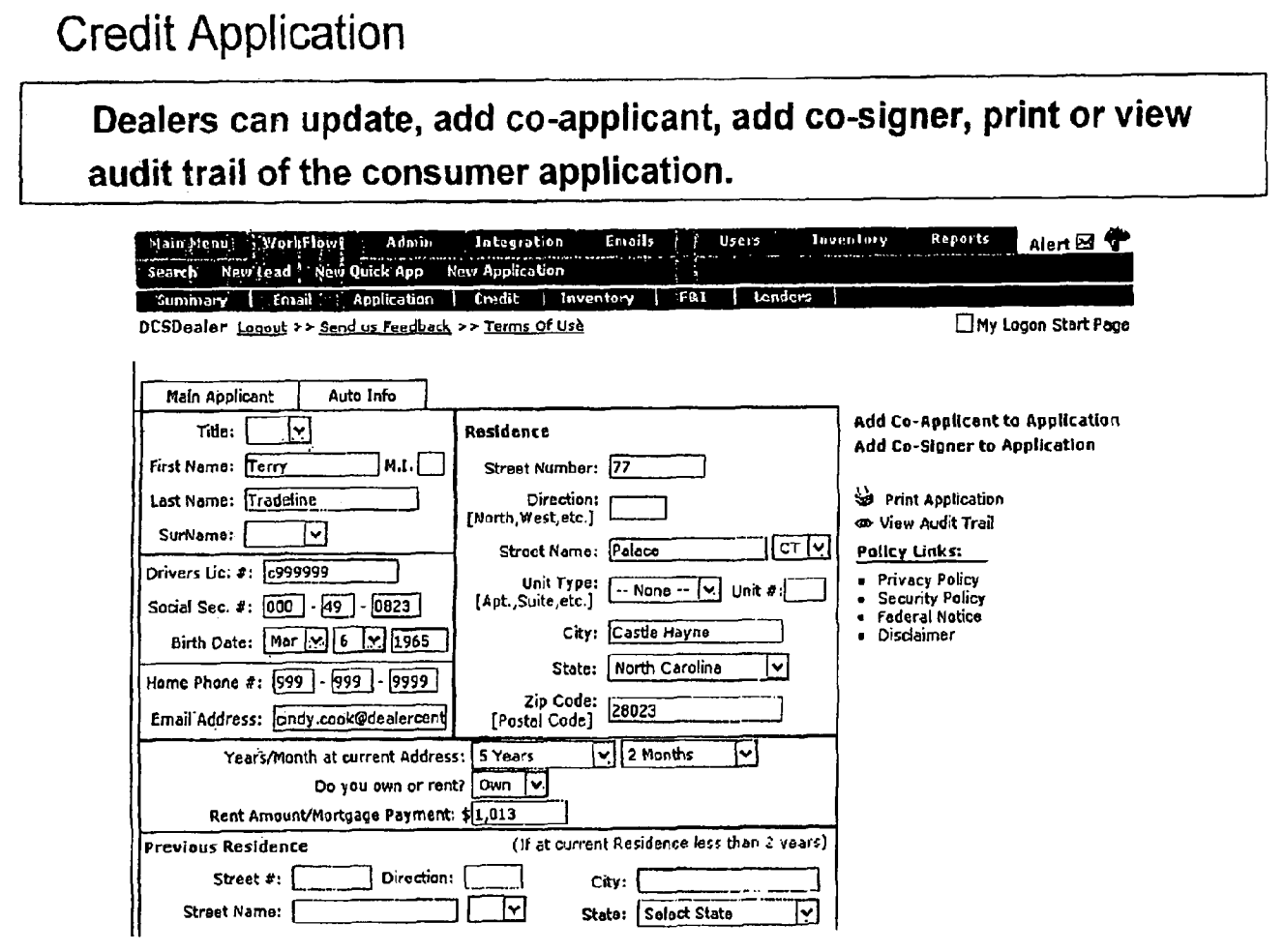

Credit Application

Dealers can update, add co-applicant, add co-signer, print or view audit trail of the consumer application.

Fig. 15

Email Responders

Dealers can select from their template emails to send to consumers for follow-up.

Fig. 16

F&I Tool

Dealers can roll-back fields and compare purchase to lease, and save multiple deals etc.

Fig. 17

Inventory

Dealers can match the consumer vehicle request to a specific vehicle in inventory which auto-populates the F&I page.

| Main Menu | WorkFlow | Admin | Integration | Emails | Users | Inventory | Reports | Alert |
|---|---|---|---|---|---|---|---|---|
| Search | New Lead | New Quick App | New Application | | | | | |
| Summary | Email | Application | Credit | Inventory | F&I | Lenders | | |

DCSDealer Logout >> Send us Feedback >> Terms Of Use ☐ My Logon Start Page

Inventory                                                                 Prospect: Terry Tradeline Found 10 Cars                Filter by Price Range: $0 ▼  No Maximum ▼

Body Type: All Body Types ▼  Year: 2005 ▼  Make: All Makes ▼  Model: All Models ▼  search

| Stock # | Body Type | Year | Make | Model | Trim | DiStk | MSRP | |
|---|---|---|---|---|---|---|---|---|
| 123456789 | Sport Utility Vehicle | 2005 | Toyota | 4Runner | SR5 | 12 | $28,060.00 | View |
| 123456790 | Sedan | 2005 | Toyota | Avalon | XL | 91 | $26,890.00 | View |
| 123456791 | Sedan | 2005 | Toyota | Camry | LE | 2 | $19,660.00 | View |
| 123456792 | Sedan | 2005 | Toyota | Corolla | LE 4AT | 14 | $16,205.00 | View |
| 123456793 | Sport Utility Vehicle | 2005 | Toyota | Highlander | | 13 | $24,645.00 | View |
| 123456794 | Wagon | 2005 | Toyota | Matrix | | 14 | $15,275.00 | View |
| 123456795 | Hatchback | 2005 | Toyota | Prius | HYBRID | 18 | $21,415.00 | View |
| 123456796 | Mini Van | 2005 | Toyota | Sienna | LE 7-PASSENGER | 42 | $25,270.00 | View |
| 123456796 | Pick-up | 2005 | Toyota | Tacoma | 4X4 ACCESS CAB | 24 | $21,255.00 | View |
| 123456797 | Pick-up | 2005 | Toyota | Tundra | REGULAR CAB SAT | 57 | $17,335.00 | View |

Page 1 - No other pages

Fig. 18

Lender Filtering and Routing

Dealers can match consumer credit profiles and vehicle requests to specific lender tiered programs at the point of sale and transmit apps and decisions electronically with lenders.

| Main Menu | Workflow | Admin | Integration | Emails | Users | Inventory | Reports | Alert |
|---|---|---|---|---|---|---|---|---|
| Search | New Lead | New Quick App | New Application | | | | | |
| Summary | Email | Application | Credit | Inventory | F&I | Lenders | | |

DCSDealer Logout >> Send us Feedback >> Terms Of Use    ☐ My Logon Start Page

Finance:    Prospect: Terry Tradeline

| Lenders | Tier 1 2 3 4 5 6 | Decision | Amount | BuyRate | Details | Contract | Date |
|---|---|---|---|---|---|---|---|
| - Dealership Filters - | ✗ ✓ ✓ ✓ ✓ ✓ | Send | | | | | |
| WFS Financial | ✓ ✓ | Resend | | | | | |
| ABC Credit Union | ✗ ✓ ✓ ✓ ✓ ✓ | Resend | $17,835.00 | 0% | Details | Assign | 3/6 8:52 AM |
| ABC Finance | ✗ ✗ ✓ ✓ ✓ ✓ | Sent | Pending | | | | |
| ABC Bank | ✗ ✓ ✓ ✓ ✓ ✓ | Resend Approved | $22,295.00 | 8% | Details | Assign | 2/11 6:21 AM |

Legends: ✓ Passed Program Guidelines   ✗ Failed Program Guidelines (Click on Icon to view Failed Reasons)
ⓘ Missing Critical Information for Decision

Credit Profile Summary:    Modify Purchase

| | | |
|---|---|---|
| Quick App Filters: Passed | Credit Score: 659 | |
| Credit History: 12Y/3M | High Credit: $84,200 | |
| Rent/Own: Own | Residence History: 5Y/2M | |
| Employment History: 5Y/1M | DTI: 37.15% | |
| PTI: 7.15% | LTV: 114.04% | |
| Sales Price: $21,995.00 | Term: 60 Months | |
| Total Down: $3,500.00 | APR Rate: 9.00 | |
| Amount Financed: $22,295.27 | Invoice: $19,550.00 | |
| Payment: $464.71 | Miles: 1,002 | |

Financial Status

Finance Status: None Found    View Finance History
Comments: None Found
Change Finance Status Send Deal to: [DMS ▼]    Send!

Send Application to Archive

Fig. 19

Lender Credit Filtering Tier 1

Lenders can input up to 6 different finance tier programs into the finance system. The robust decision engine filters credit applications based on lender program guidelines, ability/stability factors and credit data.

Advanced Filter Configuration

Available Programs:

| Tier 1 | Tier 2 | Tier 3 | Tier 4 | Tier 5 | Tier 6 |

Tier #1 - Program Guidelines:

Choose Filter ▼    - Choose Condition - ▼    Add Filter

| | | Filter Rule | Date Added |
|---|---|---|---|
| Modify | Delete | Loan Amount <= $90,000 | 4/17/2006 2:58 PM |
| Modify | Delete | Term Months <= 66 | 4/17/2006 2:59 PM |
| Modify | Delete | Interest Rate >= 4.75% | 2/8/2006 7:57 AM |
| Modify | Delete | Mileage <= 100,000 | 2/8/2006 7:57 AM |
| Modify | Delete | Age of Unit in Years <= 10 | 2/8/2006 8:01 AM |
| Modify | Delete | Loan to Value <= 150% | 2/9/2006 2:48 PM |

Tier #1 - Ability/Stability:

Choose Filter ▼    - Choose Condition - ▼    Add Filter

| | | Filter Rule | Date Added |
|---|---|---|---|
| Modify | Delete | Gross Monthly Income >= $1,500 | 2/8/2006 7:58 AM |
| Modify | Delete | Debt to Income Ratio <= 50% | 2/8/2006 7:58 AM |
| Modify | Delete | Payment to Income Ratio <= 20% | 2/8/2006 7:59 AM |
| Modify | Delete | Months at Residence >= 12 | 2/8/2006 7:59 AM |
| Modify | Delete | Months at Job >= 12 | 2/8/2006 8:01 AM |

Tier #1 - Credit:

Choose Filter ▼    - Choose Condition - ▼    Add Filter

| | | Filter Rule | Date Added |
|---|---|---|---|
| Modify | Delete | Fair Issac Credit Score >= 700 | 2/11/2006 6:26 AM |
| Modify | Delete | Trade History in Months >= 18 | 11/21/2006 6:06 AM |
| Modify | Delete | Trade High in $ >= $3,000 | 2/12/2006 8:57 AM |
| Modify | Delete | Revolving Acct. History Min. Months >= 24 | 3/6/2006 8:54 AM |
| Modify | Delete | Revolving Acct. High in $ = $1,000 | 4/24/2006 10:37 AM |

Copy Tier #1 to Tier #2 ▼    Move Filters    |    Reset Current Tier Filters    |    Show Filter Descriptions

Fig. 20(a)

Lender Credit Filtering Tier 2

Advanced Filter Configuration

Available Programs:

| Tier 1 | Tier 2 | Tier 3 | Tier 4 | Tier 5 | Tier 6 |

Tier #2 - Program Guidelines:

Choose Filter [▼]  — Choose Condition — [▼]  [ ]  Add Filter

| | Filter Rule | Date Added |
|---|---|---|
| Modify Delete | • Loan Amount <= $100,000 | 2/8/2006 8:03 AM |
| Modify Delete | • Term Months <= 72 | 2/8/2006 8:03 AM |
| Modify Delete | • Interest Rate >= 4.75% | 2/8/2006 8:03 AM |
| Modify Delete | • Mileage <= 80,000 | 2/8/2006 8:03 AM |
| Modify Delete | • Age of Unit in Years <= 10 | 2/8/2006 8:03 AM |
| Modify Delete | • Loan to Value <= 150% | 2/9/2006 2:45 PM |

Tier #2 - Ability/Stability:

Choose Filter [▼]  — Choose Condition — [▼]  [ ]  Add Filter

| | Filter Rule | Date Added |
|---|---|---|
| Modify Delete | • Debt to Income Ratio <= 50% | 2/8/2006 8:03 AM |
| Modify Delete | • Payment to Income Ratio <= 20% | 2/8/2006 8:03 AM |
| Modify Delete | • Months at Residence >= 12 | 2/8/2006 8:03 AM |
| Modify Delete | • Months at Job >= 12 | 2/8/2006 8:03 AM |

Tier #2 - Credit:

Choose Filter [▼]  — Choose Condition — [▼]  [ ]  Add Filter

| | Filter Rule | Date Added |
|---|---|---|
| Modify Delete | • Fair Issac Credit Score >= 590 | 8/14/2006 11:15 AM |

Copy Tier #2 to Tier #1 [▼] Move Filters | Reset Current Tier Filters | Show Filter Descriptions

Fig. 20(b)

Lender Credit Filtering Tier 3

Advanced Filter Configuration

Available Programs:

| Tier 1 | Tier 2 | Tier 3 | Tier 4 | Tier 5 | Tier 6 |

Tier #3 - Program Guidelines:

Choose Filter [▼]    - Choose Condition - [▼]    [ ] Add Filter

| Filter Rule | | Date Added |
|---|---|---|
| Modify Delete | • Loan Amount <= $80,000 | 2/8/2006 8:05 AM |
| Modify Delete | • Term Months <= 72 | 2/8/2006 8:04 AM |
| Modify Delete | • Mileage <= 100,000 | 2/8/2006 8:06 AM |
| Modify Delete | • Age of Unit in Years <= 7 | 2/8/2006 8:06 AM |

Tier #3 - Ability/Stability:

Choose Filter [▼]    - Choose Condition - [▼]    [ ] Add Filter

| Filter Rule | | Date Added |
|---|---|---|
| Modify Delete | • Gross Monthly Income >= $2,000 | 2/8/2006 8:09 AM |
| Modify Delete | • Debt to Income Ratio <= 50% | 2/8/2006 8:04 AM |
| Modify Delete | • Months at Residence >= 6 | 2/8/2006 8:09 AM |

Tier #3 - Credit:

Choose Filter [▼]    - Choose Condition - [▼]    [ ] Add Filter

| Filter Rule | | Date Added |
|---|---|---|
| Modify Delete | • Fair Issac Credit Score >= 350 | 2/8/2006 8:14 AM |

Copy Tier #3 to Tier #1 [▼] Move Filters | Reset Current Tier Filters | Show Filter Descriptions

Fig. 20(c)

Lender Credit Filtering Tier 4

Advanced Filter Configuration

Available Programs:

| Tier 1 | Tier 2 | Tier 3 | Tier 4 | Tier 5 | Tier 6 |

Tier #4 - Program Guidelines:

Choose Filter [▼]   - Choose Condition - [▼]   [ ]   Add Filter

| | Filter Rule | Date Added |
|---|---|---|
| Modify Delete | • Loan Amount <= $60,000 | 2/8/2006 8:14 AM |
| Modify Delete | • Term Months <= 72 | 2/8/2006 8:14 AM |
| Modify Delete | • Mileage <= 100,000 | 2/9/2006 2:46 PM |
| Modify Delete | • Age of Unit in Years <= 10 | 2/8/2006 8:15 AM |

Tier #4 - Ability/Stability:

Choose Filter [▼]   - Choose Condition - [▼]   [ ]   Add Filter

| | Filter Rule | Date Added |
|---|---|---|
| Modify Delete | • Gross Monthly Income >= $2,000 | 2/8/2006 8:14 AM |
| Modify Delete | • Debt to Income Ratio <= 50% | 2/8/2006 8:14 AM |
| Modify Delete | • Months at Residence >= 6 | 2/8/2006 8:14 AM |

Tier #4 - Credit:

Choose Filter [▼]   - Choose Condition - [▼]   [ ]   Add Filter

| | Filter Rule | Date Added |
|---|---|---|
| Modify Delete | • Fair Issac Credit Score >= 400 | 2/8/2006 8:15 AM |

Copy Tier #4 to Tier #1 [▼]   Move Filters   |   Reset Current Tier Filters   |   Show Filter Descriptions

Fig. 20(d)

Lender Credit Filtering Tier 5

Advanced Filter Configuration

Available Programs:

| Tier 1 | Tier 2 | Tier 3 | Tier 4 | Tier 5 | Tier 6 |

Tier #5 - Program Guidelines:

| Choose Filter ▼ | - Choose Condition - ▼ | | Add Filter |

Filter Rule | Date Added
- Modify  Delete  • Loan Amount <= $70,000 — 2/8/2006 8:16 AM
- Modify  Delete  • Term Months <= 72 — 2/8/2006 8:15 AM
- Modify  Delete  • Mileage <= 150,000 — 2/8/2006 8:15 AM
- Modify  Delete  • Age of Unit in Years <= 10 — 2/8/2006 8:15 AM

Tier #5 - Ability/Stability:

| Choose Filter ▼ | - Choose Condition - ▼ | | Add Filter |

Filter Rule | Date Added
- Modify  Delete  • Gross Monthly Income >= $2,000 — 2/8/2006 8:15 AM
- Modify  Delete  • Debt to Income Ratio <= 50% — 2/8/2006 8:15 AM
- Modify  Delete  • Months at Residence >= 6 — 2/8/2006 8:15 AM

Tier #5 - Credit:

| Choose Filter ▼ | - Choose Condition - ▼ | | Add Filter |

Copy Tier #5 to Tier #1 ▼ | Move Filters | Reset Current Tier Filters | Show Filter Descriptions

COMPUTER IMPLEMENTED FINANCE MANAGEMENT ROUTING SYSTEM

FIELD OF THE INVENTION

The present invention relates generally to data processing, and more particularly, the present invention relates to a finance management routing system providing for among other things, data entry, storage, decision processing including filtering, tracking, and result presentation for use in, among other things, loan transactions relating to the purchase of an automobile.

BACKGROUND OF THE INVENTION

In many businesses, including the auto industry, there is a lack of seamless integration between the sales process and the finance process. Auto dealers, for example, use a multitude of Internet lead generation companies such as Autotrader, Cars.com, Autobytel, etc., to showcase their inventory, build brand awareness, and attract online customers. Simultaneously, these on-line portals feature loan-financing ads from direct-to-consumer lenders such as LendingTree® that compete for finance revenue with many auto dealers whose website finance link is an email lead sent to the auto dealer's Internet manager. In this regard, the absence of an on-line lending solution for those websites is a detriment to the auto dealer's profits.

Transacting the right type of automotive finance with the right customer has traditionally been a challenge for all parties (dealer, lender, and customer) involved in the transaction. For example, auto dealers sort through showroom and web based leads that are rarely financially pre-qualified and spend valuable time dealing with customers on vehicles that don't match their credit profile. In addition, the auto dealer's finance and insurance (F&I) process must continually stay abreast of new and ever changing programs offered from lenders; the best source to place a loan contract this week may not be the same as the previous week. Lenders struggle to obtain credit applications that meet their lending criteria while avoiding those applications that will be declined, and customers' knowledge of lending products on the market is limited and they look for new ways to obtain more details about loan programs than just the loan rate.

While the advent of the Internet has spawned new attempts to improve the consumer's experience of the loan process, first generation website approaches focused on a limited number of loan products and applied outdated loan process business models to the Internet. These first generation websites failed to fulfill the needs of today's broad spectrum of on-line consumers.

Accordingly, there is market demand for an infrastructure technology platform that creates efficiencies in the marketplace, reduces cost, and increases revenue while building goodwill with customers, clients, and partners. In this regard, it is desirable to provide a method and apparatus that provides a gateway between the sales process and the finance process that is able to capture vehicle purchases from lead generators, while allowing on-line customers to obtain pre-approved automotive financing on dealer websites before they reach the showroom.

SUMMARY OF THE INVENTION

For the purpose of summarizing the invention certain objects and advantages have been described herein. It is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Broadly, the present invention relates to data processing, and in general features contact lead and management tools, online dynamic credit application repository interfaces, parsing and merging logic of credit reports, credit filtering, vehicle inventory management and selection, finance deal structuring, fully automated decision processing and management reports. In one embodiment, the present invention provides a gateway between sales and finance departments, able to transmit and receive data with at least lead generators, customer relations management systems (CRM), application processing systems (APS), dealer management systems (DMS), and lenders.

More particularly, the present invention is an online/web based or offline finance management system relating to the auto industry that enables sellers to initiate, process, and decision loan transactions with financial institutions. In one embodiment, the present invention offers a web-based interactive application link on vehicles researched by Internet shoppers in the comfort of their own homes through Internet portal lead generators enabling auto dealers to decision (determine finance qualification), associated with a specific vehicle in inventory and approve customers before they reach the showroom. The interactive application preferably includes audio, and text and video messages that entice and reward the customer throughout the process of providing detailed information. Through integration of prospect/lead inventory and lender management technology tools into a unified platform, the present invention enables control of the entire loan application from prospecting to contracting, all at the point of sale.

The financial management system platform described herein preferably includes a decision engine that retrieves and combines the borrower's credit file(s), combines it with the application information, and matches the information against a lender's proprietary mix of loan programs, pricing, credit policies and/or custom scoring models to determine if a borrower has qualified for a loan. In this regard, potential buyers are provided with the same financing sources that auto dealers utilize in the showroom. As such, auto dealers can pre-qualify customers to specific vehicles and lender programs at the beginning of the sales process, take the guesswork out of structuring deals, distinguish between shoppers and real buyer, and provide customers with a better buying experience. Having pre-approved financing at the front of the sales process determines payment options and enables auto dealers to put the right customer in the right vehicle, potentially structuring a profitable deal before the customer ever performs a test drive.

In contrast to a "shotgun" approach where a credit application is sent to multiple lending sources simultaneously in an attempt to obtain at least one loan approval, the present invention utilizes, at least credit filtering to decision funding by comparing borrower information and lending source defined criteria. By matching borrowers to lending sources most likely to fund a specific purchase, the present invention supports the transaction rather than a particular interest, thereby providing an added service to borrowers, lenders, and the auto industry as a whole. Accordingly, financial institutions or lenders potentially realize operational cost savings by eliminating data entry and, only incurring costs associated with credit applications they would be likely to find, rather than applications processed. The process described herein allows lenders the ability to increase application penetration, and source contracts generated by their dealer partners' web marketing initiatives, while effectively reducing competitive efforts by direct to consumer lenders to capture finance customers before they reach the auto dealership.

These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIGS. 3-5 show examples of various interactive screens an applicant may be presented with when completing portions of a "Quick Application" as described herein.

FIG. 7 shows one example of pre-approval filters that may be provided for establishing pre-approval criteria in the "Quick Application".

FIGS. 8-11 show further examples of various interactive screens an applicant may be presented with when completing portions of the "Quick Application" as described herein.

FIGS. 12-16 show examples of various reports, forms, modules, and tools provided by the "system".

FIG. 17 shows one example of an F&I module provided by the "system" in accordance with one embodiment of the present invention.

FIG. 18 shows one example of an Inventory module provided by the "system" in accordance with one embodiment of the present invention.

FIG. 19 shows one example of a Lender module provided by the "system" in accordance with one embodiment of the present invention.

Figure 20F:
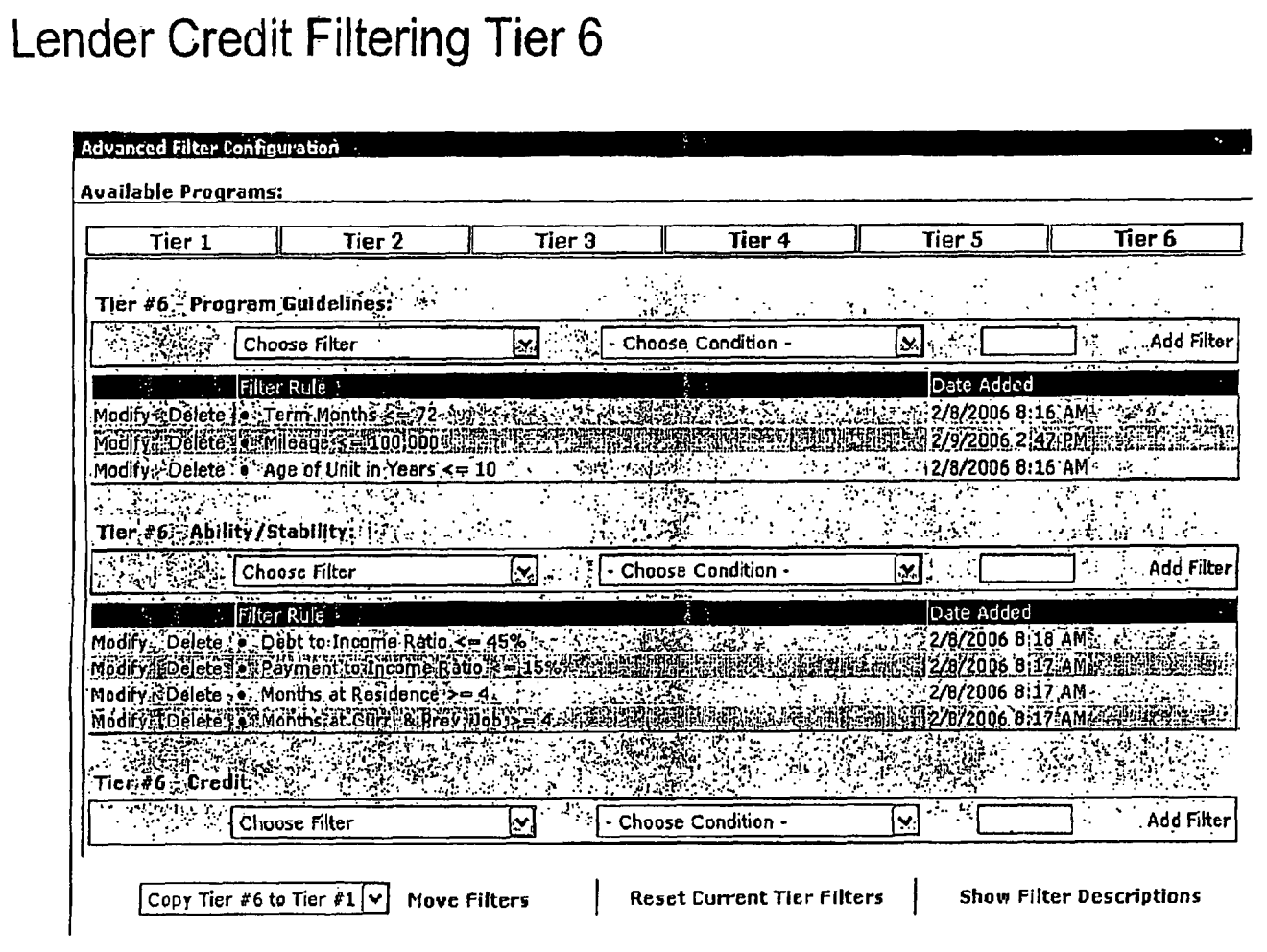

FIGS. 20(a)-(f) show examples of a lender's filter and loan criteria used in association with the lender module of the "system" in accordance with one embodiment of the present invention.

DETAILED DESCRIPTION

Figure 1:
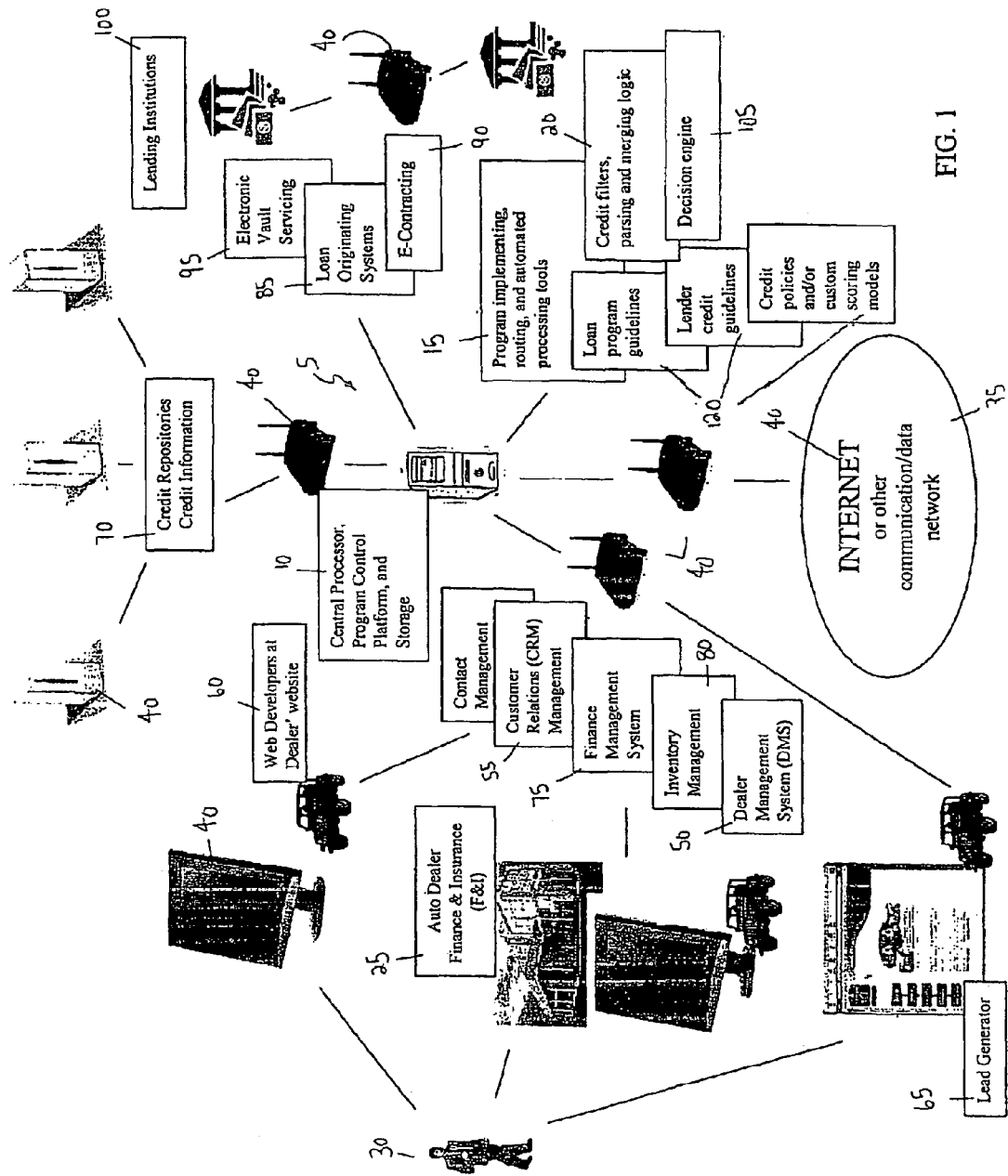
FIG. 1 is shows general data/communication connectivity between a computer implemented finance management routing system, herein referred to as the "system" of the present invention and related entities in one embodiment of an auto purchase/finance network.

Embodiments of the present invention will now be described with references to the accompanying Figures, wherein like reference numerals refer to like elements throughout. The terminology used in the description presented herein is not intended to be interpreted in any limited or restrictive manner, simply because it is being utilized in conjunction with a detailed description of certain embodiments of the invention. Furthermore, various embodiments of the invention (whether or not specifically described herein) may include novel features, no single one of which is solely responsible for its desirable attributes or which is essential to practicing the invention herein described.

As shown in FIG. 1, the computer implemented finance management routing system 5 of the present invention, herein referred to as the finance management system or simply the "system", includes, among other things, a central processor and a program control platform 10 including at least program implementing, routing, and automated processing tools 15 having credit filters, and parsing and merging logic 20 of credit reports capabilities.

The "system" platform is designed to assist, among others, auto dealers 25 in capturing and converting customer 30 inquiries into leads with credit applications and credit reports, and pre-qualifying Internet or offline consumers to specific vehicles and lender programs at the beginning of the sales process to streamline the process of structuring deals in a consistent, efficient, and cost-effective manner.

The "system" platform is generally structured to build a web-based technology solution for the benefit of the auto dealer 25 and consumer 30. The "system" 5 appeals to the consumer 30 by making it easier to apply for and receive approval on financing, and offers a relatively faster and more pleasant buying experience. As such, the "system" 5 functions as an advocate for the consumer 30 and auto dealer 25 by providing a technological boost to simplify the sale and finance process.

As further shown in FIG. 1, the finance management system 5 is operably coupled or connected to a communication medium, such as a local or wide area network 35, by one or more network devices 40. Although shown connected to a network such as the Internet 45, persons of ordinary skill in the art will understand that the finance management system 5 described herein may take a variety of other network forms. In addition, persons of ordinary skill in the art will understand that the network devices 40 including operating systems, connectivity of those devices or systems to the network 35, and the connectivity of the network 35 itself may take many forms while still enjoying the benefits of the present invention.

Figure 2:
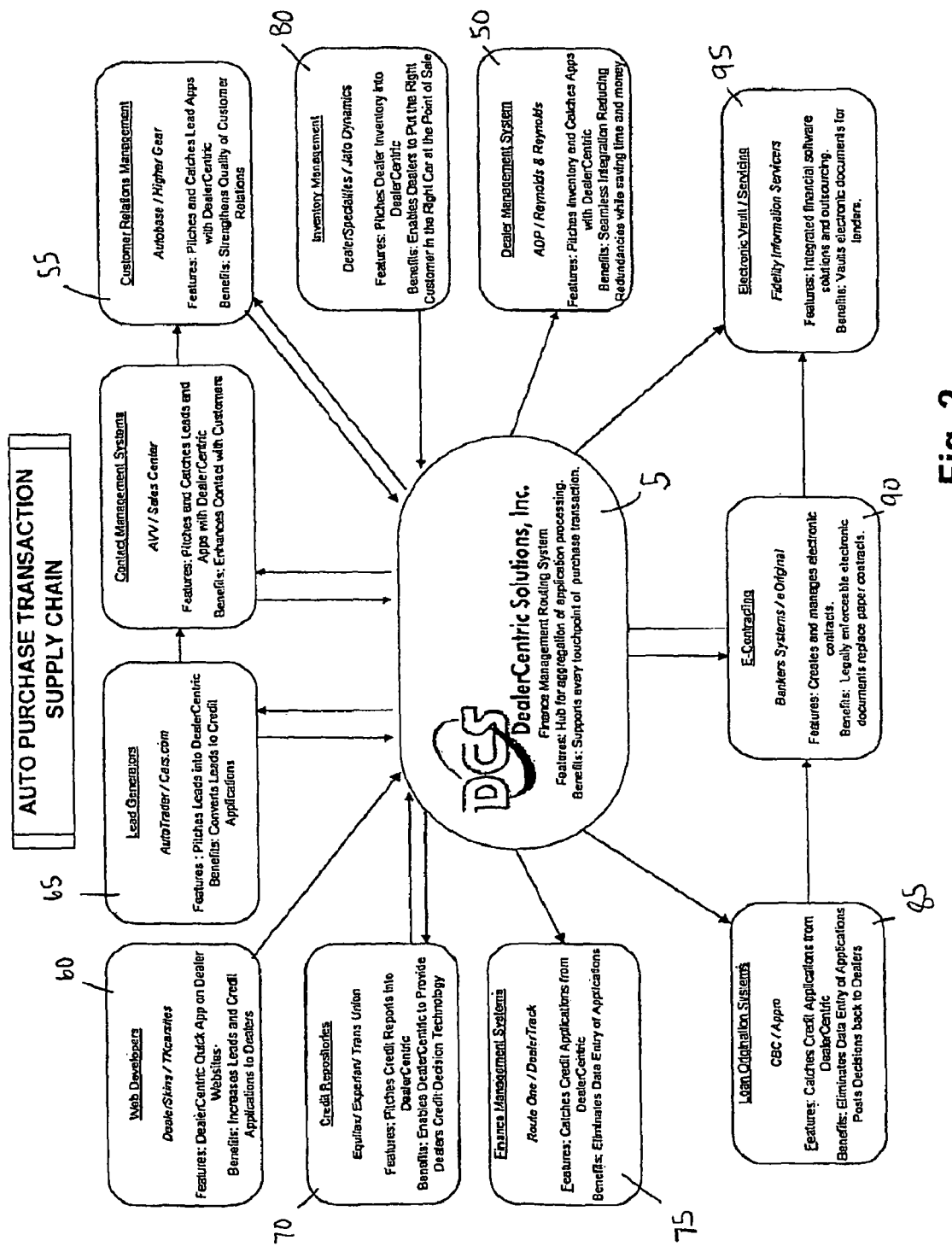
FIG. 2 shows how the "system" may operate as a "hub" within an auto transaction supply chain to integrate, among other things, lead generation via the web with the auto sales process and the auto finance process.

The "system" 5 may operate as a stand alone web-based program and/or integrate with Dealer Management Systems (DMS) 50, Internet Lead Management tools, and Customer Relations Management Systems (CRM) 55 tools, to name a few. In this regard, as shown in FIG. 2, the "system" 5 may operate as a "hub" within an auto transaction supply chain. Among others, supply chain entities may include:

(1) Web developers 60 use the "system" as an added value service to auto dealers and the dealer's customers. In this regard, a "system" generated interactive credit "Quick Application" provides customers visiting a dealer's website with online credit pre-approval.

(2) Lead generation companies 65, such as AutoTrader and Cars.com; Contact management companies, such as AVV; and Customer Relations Management companies (CRMs), such as Autobase, use the "system" to electronically transmit consumer lead information and finance requests between auto dealer systems. Such leads typically contain consumer contact information along with the year, make, and model of vehicle(s) in which the consumer has shown interest. The "system" receives the lead information and places the data into "system" storage for auto dealer personnel to manage and convert the leads into credit applications. The "system" further communicates consumer application data, pre-approval and finance status back to the Contact Management and Customer Relations systems. In this regard, the "system" connects the sales and finance process together, where they have traditionally functioned independently of each other, despite being ultimately dependent on each other.

(3) Credit Repository companies 70 such as Equifax, Experian, and TransUnion, use the "system" to electronically transmit consumer information into the "system" for subsequent transmission to auto dealers. The credit data is used in conjunction with the "system's" decision engine, enabling auto dealers to offer pre-approved credit to consumers online nearly instantaneously. The credit repository data is also used to prequalify consumers to specific credit tier programs of multiple lenders at the point of sale. In this way, the "system" ensures that the agreed upon vehicle sales structure between the auto dealer and the consumer will also be agreeable to the dealer's lending partners.

(4) Finance management systems 75, such as Dealer Track, use the "system" as a conduit between the auto dealer's sales and finance departments to electronically import consumer credit applications. The "system" eliminates duplicate data entry between auto dealer's CRMs, lead generators, web developers, and back end processing systems. The "system" provides a single point for auto dealers to distribute credit applications to all their lending partners regardless of which application process system the lending partner prefer.

(5) Inventory management companies 80, such as Dealer-Specialists and Jato Dynamics, use the "system" as an added value service to auto dealers and their customers. The inventory company provides vehicle configuration to specific manufacturer equipment and pricing. The "system" unites inventory leads and credit applications to minimize application rewrites and eliminates that cost from auto dealer's lost profits.

(6) Dealer management systems (DMS) 50, such as ADP and Reynolds & Reynolds, use the "system" to reciprocally transmit application and vehicle purchase and inventory data between systems for auto dealers. DMS's export vehicle inventory into the "system" enabling auto dealers to not only match customer(s) with vehicle(s), but also, ensures the deal structure meets lender specific credit program guidelines at the point of sale. The "system" communicates consumer application data, deal structure, and finance status to the DMS to reduce the costs of redundant data entry.

(7) Loan originating systems 85, such as CBC and Appro, use the "system" to electronically import and receive consumer credit applications from the "system". The "system" eliminates duplicate data entry of credit applications as an added value service to their lending clients.

(8) E-Contracting systems 90, such as Banco Systems, use the "system" as an import partner to auto-populate vehicle purchase documents with consumer data and vehicle purchase information. Providers, such as eOriginal, may convert, catalog, and digitize traditional vehicle purchase documents to a paperless environment for electronic data storage.

(9) Electronic Vault-Servicing providers 95, such as Fidelity Information Services, may use the "system" as a document import partner to transfer vehicle purchase contract documents from the "system" to their lending institution clients. Electronic vault-servicing preferably provides the storage and security for all service related activities for auto lenders.

In one embodiment, the present invention provides a gateway for vehicle purchase lead management tools to seamlessly integrate the auto sales process with the auto finance process. Internet lead management tools are provided and designed to capture third party lead referrals, and communicate with auto dealers' existing DMS and CRM software programs. The present invention enables auto dealers 25 to capture and convert leads to credit applications, qualify Internet or offline consumers to specific vehicles and lender programs at the beginning of the sales process thereby taking the guesswork out of structuring auto purchase deals.

By enabling the auto dealer 25 to obtain pre-approved financing by lenders 100 toward the beginning of the sales process, the present invention allows the dealer 25 to better determine the payment a consumer 30 can afford, how much down payment is required and, also allows auto dealers 25 to put consumers 30 in the right vehicle and structure a profitable transaction before the consumer 30 enters the auto finance office for documentation.

The present invention further provides an effective and efficient indirect lending environment between lenders 100 and auto dealers 25. A decision engine 105 of the present invention is configured to accesses a borrower's credit file(s) 110, combine the files with the borrower's application information 115 and match or compare the information against a lender's proprietary mix of loan programs, pricing, credit policies and/or custom scoring models 120 to determine whether a borrower has qualified for a loan.

In this regard, preferably, through an XML interface between the "system" of the present invention and a lender's loan origination system, each lender 100 can realize operational cost savings by only incurring costs associated with credit applications they would likely fund, rather than applications processed. As such, the finance management system 5 and related method described herein, gives online lenders the ability to increase application penetration, and secure loan contracts generated by their dealer partners' web marketing initiatives, while effectively reducing competitive efforts by direct to consumer lenders to capture finance customers before they reach the dealership.

According to one embodiment of the present invention, an auto dealer 25, lender 100, or potential customer 30 may access the finance management system 5 through a service provider. In this regard, the auto dealer 25 or lender 109, for example, would register or subscribe with the service provider and access the finance management system platform by a log-in name and password. Once logged into the "system" 5 the dealer's or lender's administrator or other representative may add users and privileges to others at the dealership or lending institution.

Figure 4:
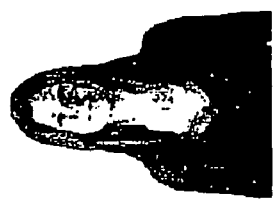
Figure 6A:
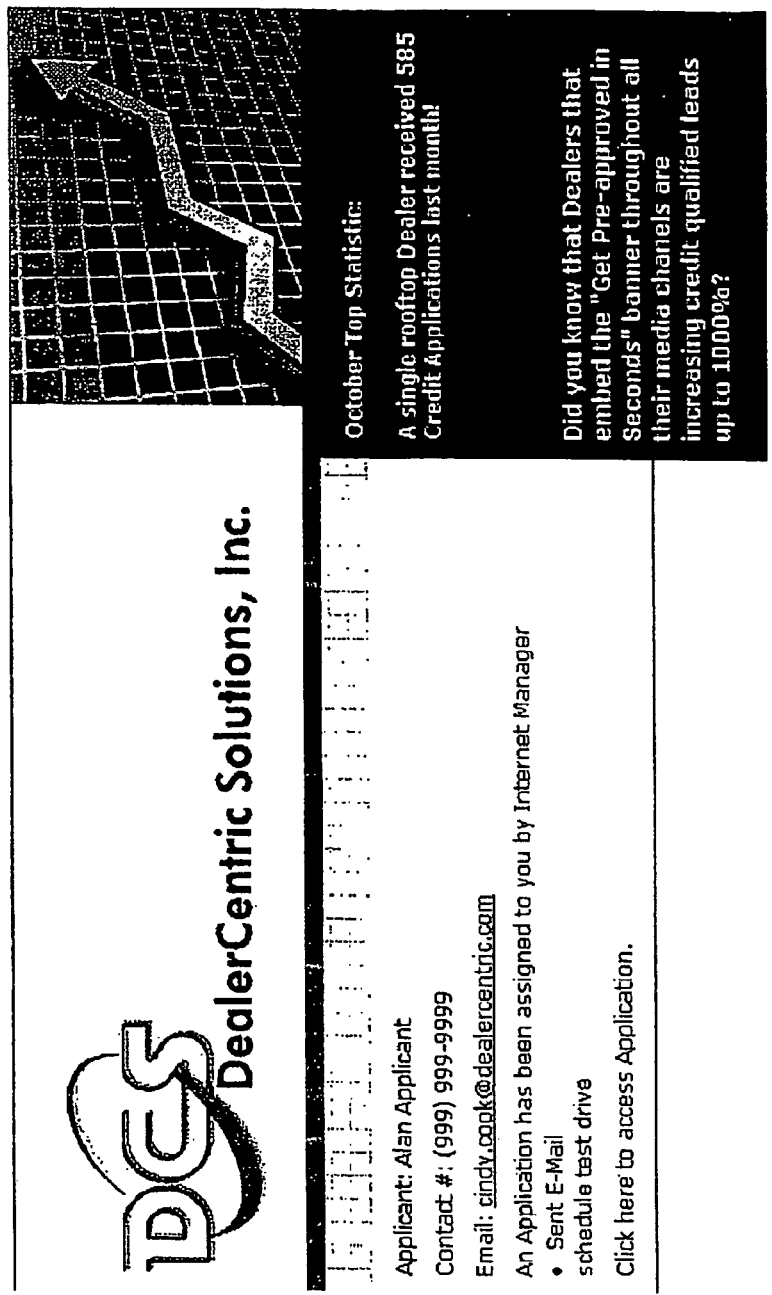
FIGS. 6(a)-(b) show examples of online email notifications that may be utilized with the present invention.
Figure 6B:
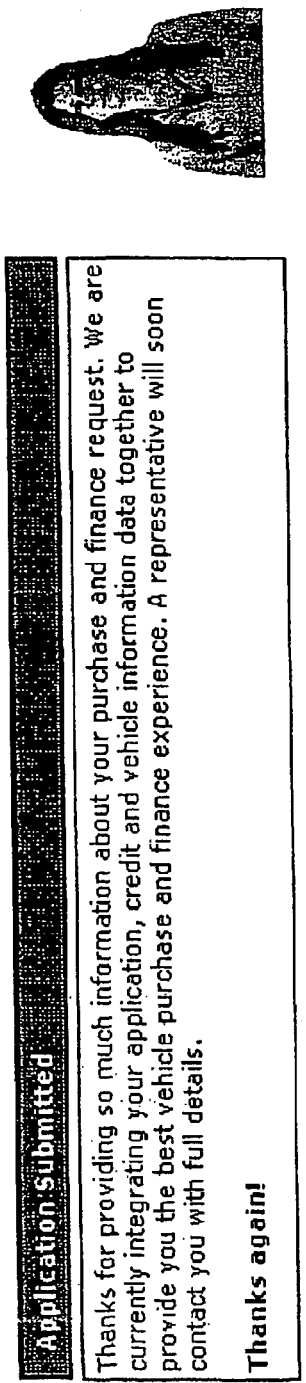
Figure 21:
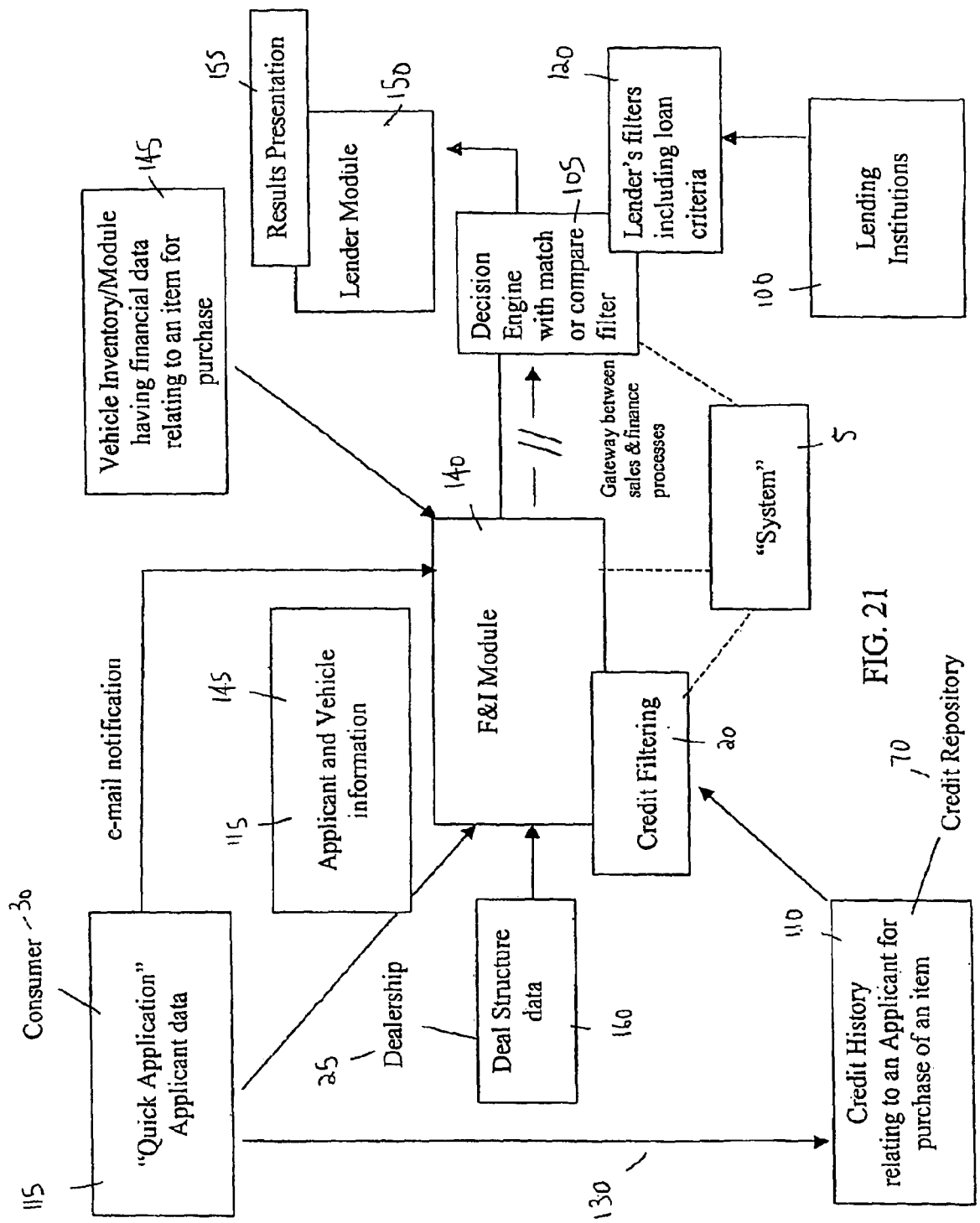
FIG. 21 shows the general relationship of information or data flow between various modules or tools as described herein and as related to the "system".

According to one embodiment of the present invention (used to bridge the gap between the traditional automotive sales and finance process) and shown in FIG. 3 and FIG. 4 (Spanish language), preferably, an interactive auto finance "Quick Application" or "Quick App" is embedded into the dealership's website. In this regard, a unique URL is created for each dealership and the "Quick App" may be "skinned" to the look and feel of the dealer's website, as shown in FIG. 5. The URL may be used and linked to a banner or other icon in any e-correspondence from the dealer to the consumer. As soon the customer inputs basic information on the "Quick App" needed to pull a credit check, such as name, social security number, birth date, and address, and clicks a submit button, (1) the dealership receives an email notification that a new application has been captured (FIG. 6A and FIG. 21), (2) the "system" pulls (requests and obtains) a credit report 130 (FIG. 21), and (3) the "system" routes the report to credit filters 135 (set and periodically modified as needed by the finance management system service provider), as shown in FIG. 7 and FIG. 21. In this regard, any one or more of the dealer's credit filters 20 may be utilized by the dealer to pre-screen potential auto buyers based on information contained in the credit report pulled through the completion and submission of basic information.

Figure 8:
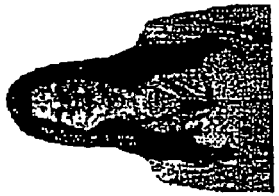

As indicated above and shown in FIGS. 8-10, the "system" 5 preferably provides an interactive "Quick Application" that includes audio, text and video messages, that hook and reward the consumer throughout the process of gathering information. For example, the consumer 30 is encouraged to complete the application even though the consumer 30 may not have met certain minimum pre-approval criteria in the hopes of receiving special financing terms (FIG. 11). In this regard, the more lead information the dealer 25 is able to capture, the more likely the dealer 25 will be able to structure a deal that is suitable for consumer 30, dealer 25, and lending institutions 100.

Figure 16:
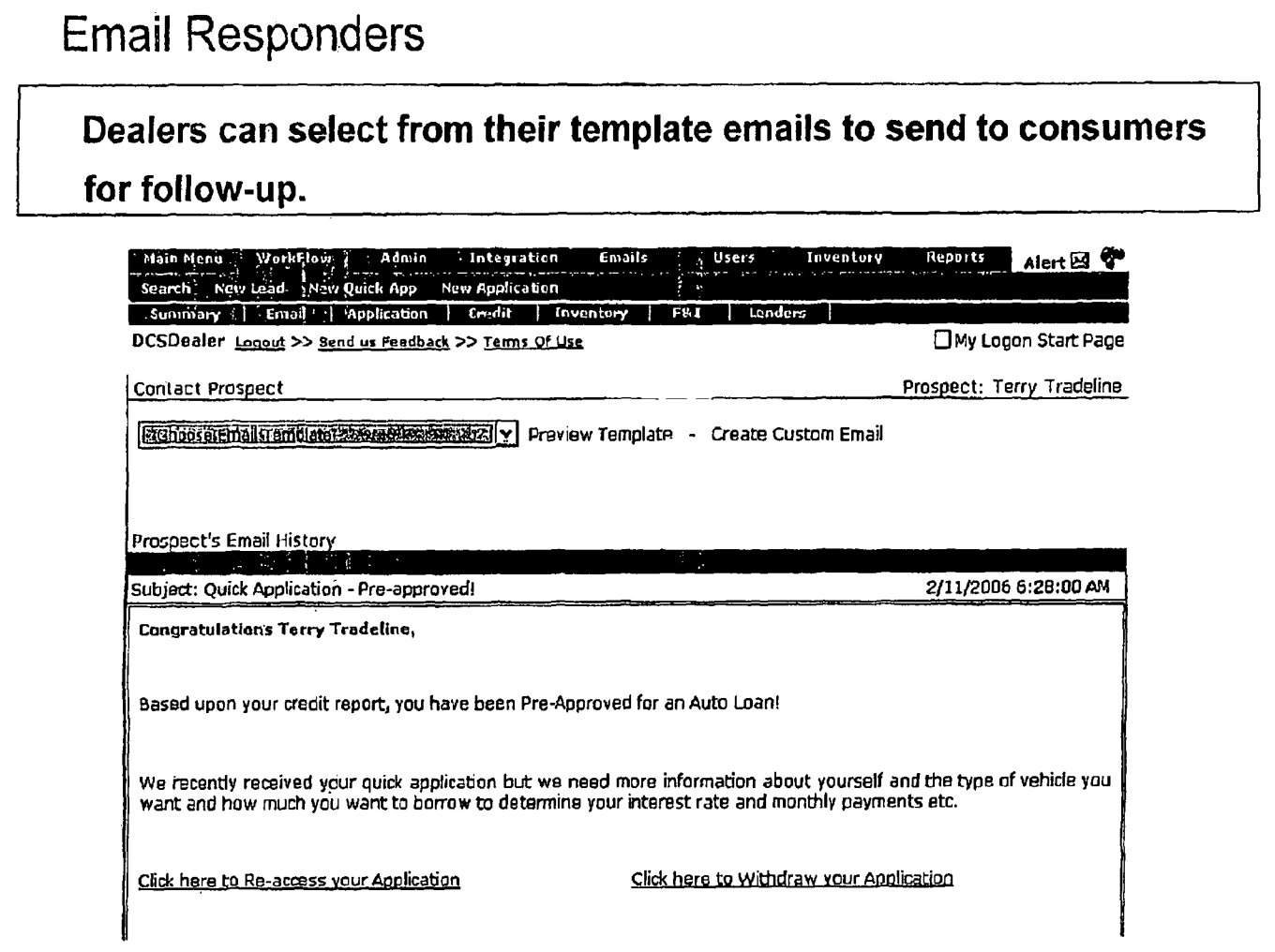

Preferably, all the information input by the customer 30 and obtained in the credit report 110 is stored on the "system" 5 and is capable of being accessed by the dealership. The dealer 25 can view the credit report 110 and compare it to the pre-approved credit criteria established by the dealership (FIG. 12). Dealers can filter, sort, and search the lead and application information by multiple criteria or various search fields for customer selection, including date, name, and credit score, to name a few (FIG. 13). The "system" workflow sub-modules include lead summary generation (FIG. 14), and permit, among other things, credit applications to be manually entered and modified. For example, a co-signer or co-applicant may be added to previously completed application(s) (FIG. 15). Preferably, changes to a previously completed credit application are stored and recorded with a date and time stamp. Other sub-modules permit (1) the customer's "status", e.g., pending, assigned, currently being processed or considered, inactive, etc., to be changed, as well as reassigned to other dealership personnel, (2) events to be noted on a calendar, and (3) emails, personalized or generic, to be sent (FIG. 16).

Figure 17:
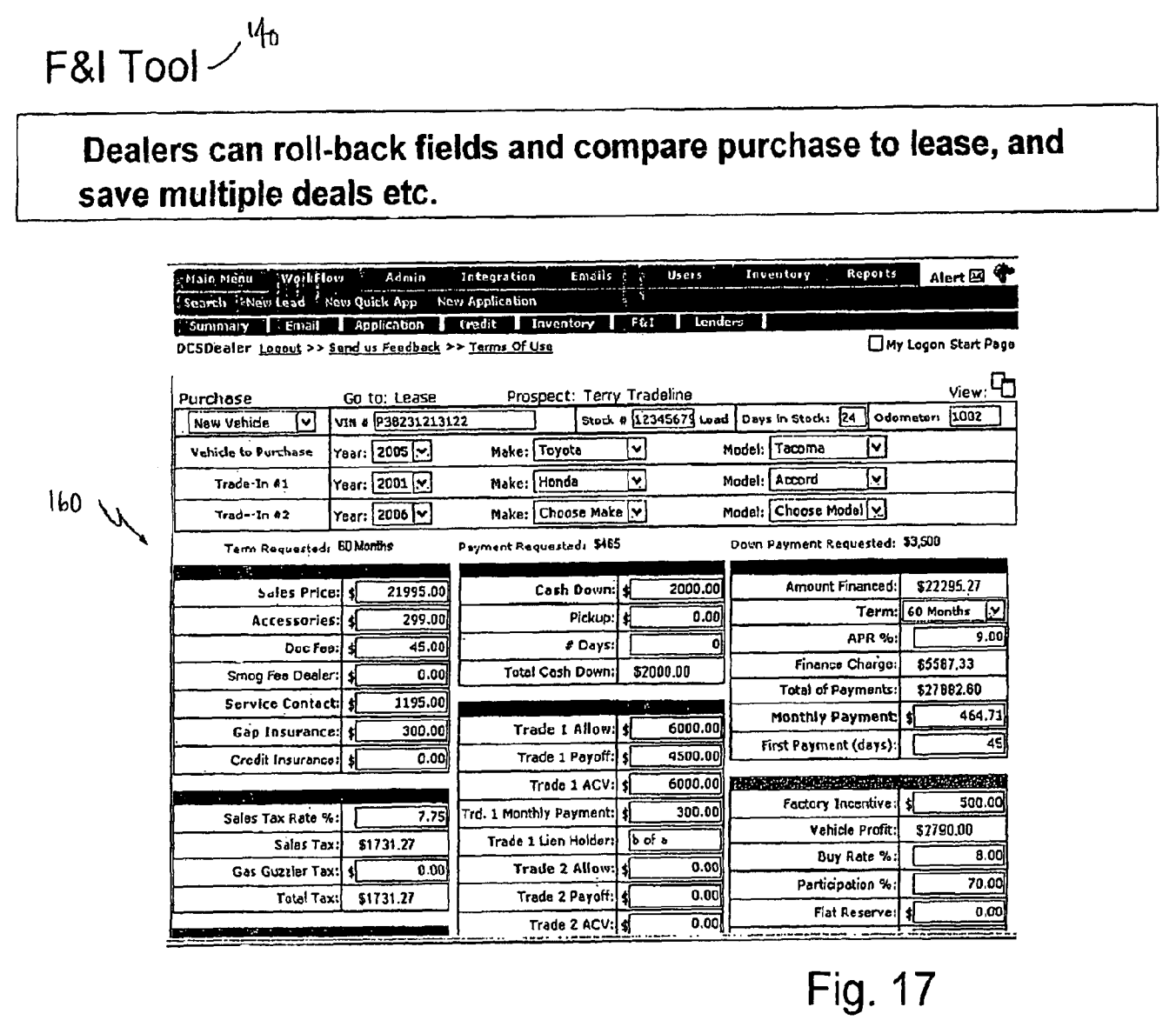

Preferably, as shown in FIG. 17, a finance and insurance (F&I) module 140 is provided. The F&I module 140 permits the dealer 25 to structure a purchase and/or lease agreement for a customer 30. In this regard, the F&I module 140 includes fields for entry of deal structure data 160 including vehicle information with sales price and other related financial information such as document fees; insurance, sales tax; trade-in allowance and down payment; financing rate, term, annual percentage rate, and payment, and dealer profit. If a particular vehicle was selected by the applicant for consideration in completing the "Quick Application" 150, that vehicle will automatically populate the appropriate section of the F&I module 140. Alternatively, if a vehicle has not been selected, a particular vehicle can be imported from a stored inventory database 145, as indicated below and shown in FIG. 18 and FIG. 21. However, it is not necessary for a vehicle to be selected for a single or multiple deal(s) to be structured.

Once stored on the "system" 5, other information that may be needed to complete a sale, finance, or lease agreement is retrieved from the "Quick Application", credit report 110, or other source stored on the "system's" database and auto-populates the appropriate section/portion of the F&I module 140, i.e., automatically fills those fields without manual intervention by dealership personnel. In addition, all the necessary forms, including sales or lease contracts, power of attorney, registration, etc., can be accessed, downloaded, and printed from the F&I module. In this regard, the F&I module 140 eliminates the need for sales consultants to constantly switch from one platform to the DMS to structure a sales, finance, and lease deal.

An inventory module (FIG. 18 and FIG. 21) is preferably also provided, allowing dealers to add or remove new vehicles from the dealer management system's vehicle inventory database. The inventory module 145 permits dealers 25 to search vehicle inventory by year, make, model, price, vehicle class, etc. The dealer's inventory may be updated online directly from the dealer management system 5. Alternatively, files may be uploaded from the dealer or a third party vendor that would typically manage the dealer's used car inventory. As indicated above, the inventory module 145 further permits customers (or dealers) to view vehicle inventory and select and link a vehicle of interest to the F&I module, 140. In this manner, vehicle information is married with customer information 115 for use in determining customer/applicant financing qualifications, terms, and conditions.

As shown in FIG. 19, a lender module 150 may be provided allowing lenders 100 to enter corresponding filters and criteria or ("tiers") 120 so that this information is accessible to the auto dealers 25. In this regard, the lender 100 may establish different tiers or levels of financing acceptability based on a variety of factors including, among others, loan amount, term, and rate; income; debt; and employment and credit history. For example, FIGS. 20(a)-(f) show tiers or levels 1 through 5 for a particular lender. Generally, each tier or level has an associated risk factor for the lender and reward factor for the applicant. In other words, the greater the financial risk an individual is perceived as having, the less favorable loan terms the lending institution may be willing to extend to that individual.

Once the customer's application is completed, a credit report has been pulled, a deal structured, and a vehicle chosen in the F&I module 140, that data or information is decision processed by the "system" 5 (matched to an appropriate lender credit criteria 120), auto-populated as needed into the lending module 150, and a determination or a result presentation 155 of a tier or level of finance acceptability is made available to the auto dealer 25. In other words, the financial management system platform 5 described herein preferably includes a decision engine 105 that retrieves the borrower's credit file(s) 110, combines it with the application information 115, and matches the information 110, 115 against a lender's proprietary mix of loan programs, pricing, credit policies and/or custom scoring models 120 to determine if a borrower 30 (consumer) has qualified for a loan, such determination being made available to the dealer 25 via the lending module 150. In this way, the lender module 150 allows each auto dealer 25 to determine which lender 100 and corresponding tiers are likely to be best suited for a particular finance (deal) structure prior to sending the finance structure to the lender 100 for final approval. As indicated previously, in contrast to a "shotgun" approach where a credit application is sent to multiple lending sources simultaneously in an attempt to obtain at least one loan approval, the present invention utilizes at least credit filtering 20 to decision funding, by comparing borrower information 115 and lending source defined criteria 120. By matching borrowers to lending sources most likely to fund a specific purchase the present invention supports the transaction rather than a particular interest, thereby providing an added service to borrowers 30, lenders 100, and the auto industry as a whole.

The lender can review the deal and communicate its financing decision back to the dealer using the "system". In this regard, the module permits the customer's credit application and deal structure to pass through directly from auto dealer to lender. The lender can then review the deal and pass its decision back to the auto dealer using the "system" platform described herein.

FIG. 21 shows the general relationship of information or data flow between various modules or tools as described herein and as related to the finance management routing system 5. As indicated herein once much of the information or data has been obtained or input into the "system" 5 appropriate fields of various documents are "auto-populated" with the information. For example, once data entry is completed relating to the "Quick Application" 115, that information or data is automatically entered into appropriate fields in the F&I module 140. Likewise, information or data contained in the F&I module 140 and information or data relating to lender's loan criteria 120 are automatically entered into appropriate fields in the lender module 150 that automatically provides a results presentation 155, based on decision engine 105 processing loan determination.

In addition to the "system's" features mentioned above, the system 5 preferably further includes a module for generating reports. This module permits standard reports such as lead summary, lender summary, and/or lead sources can be generated, as well as custom reports developed for dealers at their request.

Although the methods or processes of the present invention are illustrated herein with steps occurring in a certain order, the specific order of the steps, or any continuation or interruption between steps, is not required.

The apparatus and methods of the present invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

What is claimed is:

1. A finance management system for integrating the sale and finance of an item for purchase by an applicant, the system including:
   a central processor for executing a program, the program comprising:
   an inventory module having at least financial data relating to the item for purchase;
   a finance module for receiving application data and credit data relating to the applicant for purchase of the item, and for further receiving deal structure data based on at least the financial data relating to the item for purchase;
   a lender module for receiving finance data criteria from a lender representing applicant qualification for purchase of the item; and
   an automated decision engine for determining the finance qualification of the applicant, and for facilitating a finance deal between the applicant and the lender based on said finance qualification of the applicant;
   wherein the decision engine receives the application data, the credit data, the deal structure data, and the finance data criteria; and
   wherein the decision engine includes a filter for comparing the application data, credit data, and the deal structure data with the one or more finance data criteria, determining the finance qualification of the applicant based on the comparison, and automatically providing a result presentation of the finance qualification of the applicant.

2. The finance management system of claim 1, wherein said decision engine is configured to select a finance deal from a plurality of finance options generated based on the comparison, and present said selected finance deal to the applicant and the lender in order to facilitate a finance deal.

3. The finance management system of claim 1, wherein the finance deal between the applicant and the lender is indirect.

4. The finance management system of claim 3, wherein the finance deal between the applicant and lender is related to an automobile loan.

5. The finance management system of claim 1, wherein the result presentation presents to the user a decision regarding the finance qualification of the applicant.

6. The finance management system of claim 5, wherein the decision includes at least one of a finance option for the applicant or a report that the applicant does not qualify for financing.

7. The finance management system of claim 6, wherein a user may select said finance option for the applicant to facilitate the finance deal between the applicant and the lender.

8. The system of claim 1, in which the inventory module obtains data from an inventory management company.

9. The system of claim 1, in which the inventory module provides vehicle configuration to specific manufacturer equipment and pricing.

10. The system of claim 1, in which the credit data within the finance module includes data received from a credit repository company.

11. The system of claim 1, in which the deal structure data within the finance module involves data coordinated with an e-contracting system.

12. The system of claim 11, in which the e-contracting system imports consumer data and vehicle purchase information and uses it to auto-populate vehicle purchase documents.

13. A finance management system for integrating the sale and finance of an item for purchase by an applicant, the system including:
   a central processor for executing a program comprising,
   an automated decision engine for determining an applicant's finance qualification, and for facilitating a finance agreement between said applicant and a lender that is based on at least the applicant's finance qualification;
   wherein the decision engine includes means for receiving application data and credit data each relating to the applicant for purchase of the item, deal structure data that is based on at least financial data relating to the item for purchase, and one or more finance data criteria relating to lender qualification of the applicant for purchase of the item; and
   wherein the decision engine further includes a filter for comparing the application data, credit data, and the deal structure data with the one or more finance data criteria, determining the finance qualification of the applicant based on the comparison, and automatically providing a result presentation of the finance qualification of the applicant; and
   wherein the system further includes an interface for viewing the result presentation.

14. A method of integrating the sale and finance of an item for purchase by an applicant, the method including the steps of:
   providing a central processor for executing a program;
   executing the program by the central processor, the program including the steps of:
   receiving application data and credit data each relating to the applicant for purchase of the item, deal structure data that is based on at least financial data relating to the item for purchase, and one or more finance data criteria relating to lender qualification of the applicant for purchase of the item;
   comparing the application data, credit data, and the deal structure data with the one or more finance data criteria;
   determining the finance qualification of the applicant based on the comparison;
   automatically providing a result presentation of the finance qualification of the applicant; and structuring a finance deal between the applicant and a lender that is based on at least said finance qualification of the applicant.

15. The method of claim 9 further including the steps of:
providing a user interface; and
viewing the results presentation on the interface.

16. A method of integrating the sale and finance of an item for purchase by an applicant, the method including the steps of:
providing a central processor for executing a program;
providing the program;
executing the program with the central processor, the program having the steps of:
receiving application data and credit data each relating to the applicant for purchase of the item, deal structure data that is based on at least financial data relating to the item for purchase, and one or more finance data criteria relating to lender qualification of the applicant for purchase of the item;
comparing the application data, credit data, and the deal structure data with the one or more finance data criteria;
determining the finance qualification of the applicant based on the comparison;
automatically providing a result presentation of the finance qualification of the applicant; and
facilitating a finance deal between the applicant and a lender that is based on said finance qualification of the applicant.

* * * * *